United States Patent Office 3,538,781
Patented Nov. 10, 1970

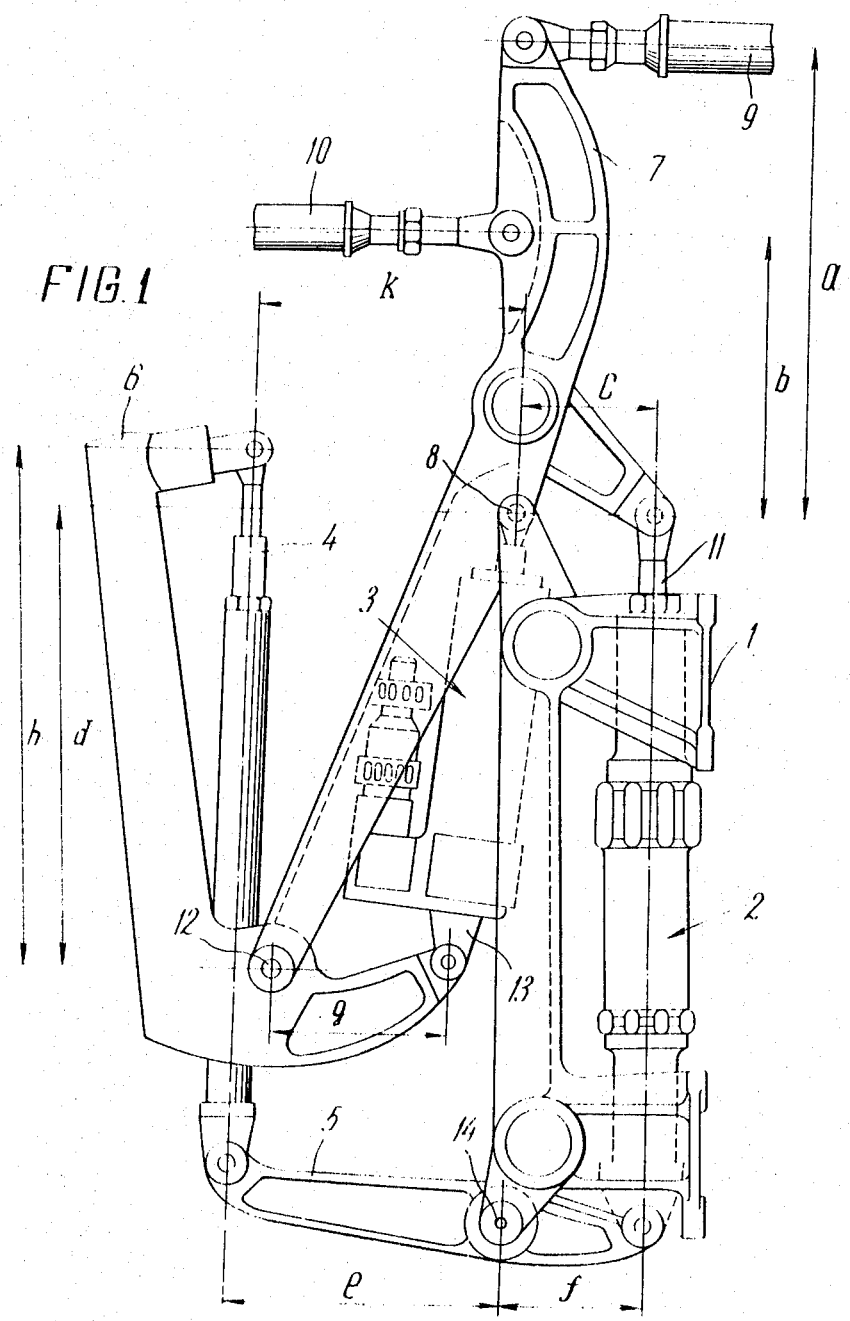

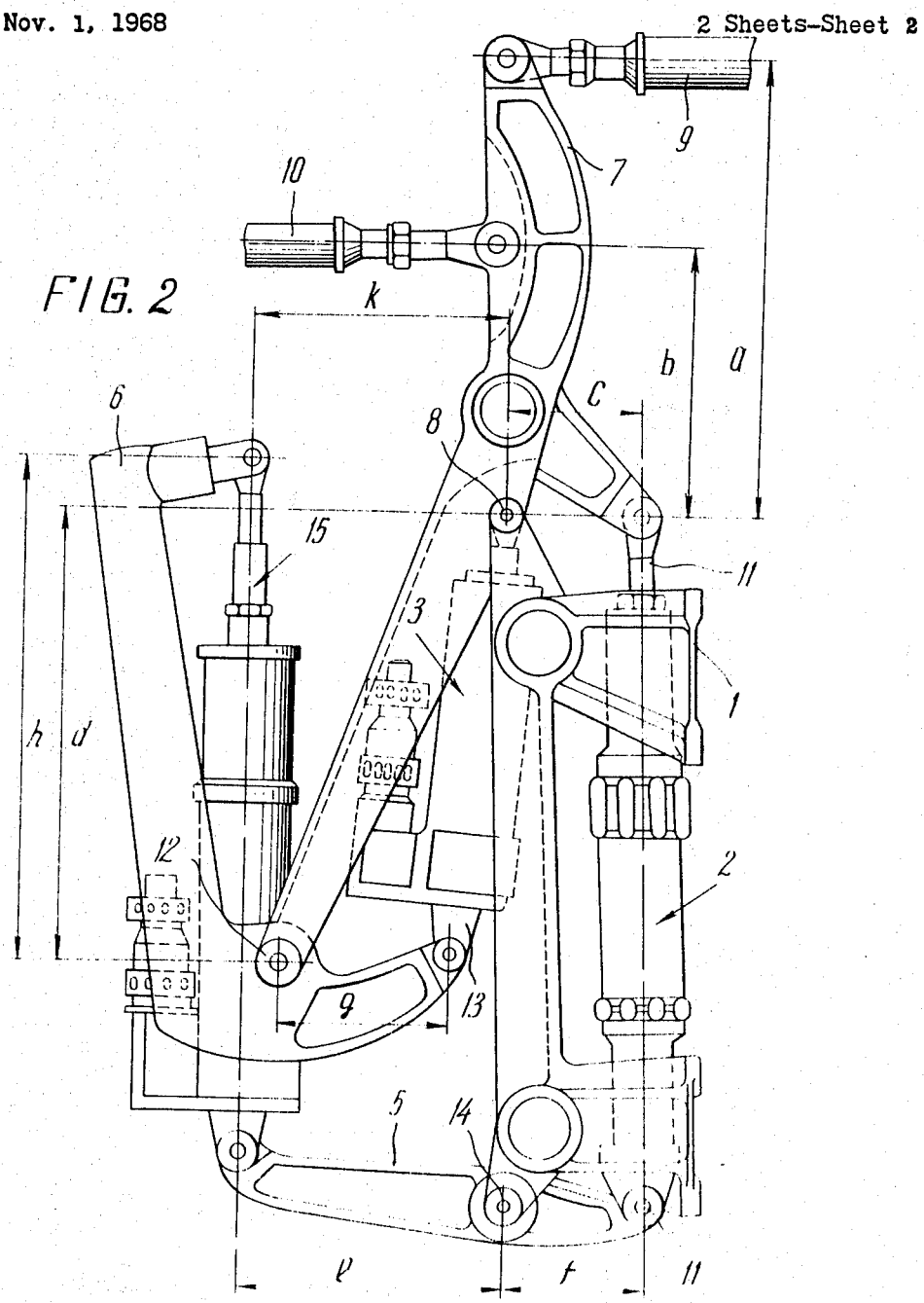

---

3,538,781
AIRCRAFT LEVERAGE SYSTEM
Mikhail Gavrilovich Ovchinnikov, Leningradsky prospekt 19, kv. 38, and Anatoly Mikhailovich Titov, Leninsky prospekt 37, kv. 75, both of Moscow, U.S.S.R.
Filed Nov. 1, 1968, Ser. No. 772,534
Int. Cl. G05g 7/00
U.S. Cl. 74—469                    2 Claims

ABSTRACT OF THE DISCLOSURE

An aircraft leverage system including an irreversible booster, a stationary housing, a turning member hinged to said housing, said booster being hinged to said turning member, and a series of interconnecting links interconnecting a control handle, a reversible charging arrangement and a device actuating gear for operating on said turning member.

---

The present invention relates to control systems of aircraft and, more particularly, to devices used for creating forces in systems of manual control over aircraft.

Known in the prior art are devices used for creating forces in the control systems of flying machines, said devices employing an irreversible booster and automatic means sensitive to velocity head and comprising an aneroid case in combination with a spring. With the flight velocity changed, a special hydraulic device alters the length of the arm of a rod connected to a rocker through which a charging arrangement is secured.

Among the disadvantages of the known device are its low reliability, nuisance loads acting upon the control handle, with the booster disengaged, and narrowing of the range of the elevator deviation angles.

An object of the present invention is to provide a device used for creating forces in systems of manual control over aircraft, in which, with the booster disengaged, no nuisance loads would act upon the control handle.

Another object of the invention is to provide such a device in which the range of the deviation angles of the actuating members would not be narrowed.

Still another object of the invention is to provide such a device which would be simple in design and reliable in operation.

In accordance with the aforesaid and other objects the subject matter of the present invention relates to the leverage system employed in the device used for creating forces in systems of manual control over aircraft using an irreversible booster and in which, after the device actuating gear starts operating, the forces acting upon the control handle are transmitted through a leverage system from a reversible charging arrangement secured on a stationary casing, the leverage system comprising two levers and a four-arm turning member having its first arm hinged to the rod of the booster, its second arm connected to the control handle, its third arm connected to the movable rod of the charging arrangement, and its fourth arm carrying the rotation axis of one of the levers, the first arm of this lever being hinged to the rod of the actuating gear of the device, the first arm of the second lever being hinged to the casing of the charging arrangement, while the second arms of said levers are interconnected by means of a rod.

When employing the device in flying machines, it is expedient that said rod be made adjustable in its length and fashioned, for instance, as a mechanism employing the effect of trimming.

Other objects and advantages of the present invention will become apparent from the following description of its exemplary embodiments, given with reference to the accompanying drawings, in which:

FIG. 1 shows a device used for creating forces in manual control systems employing an irreversible booster, according to the invention;

FIG. 2 shows another embodiment of the device used for creating forces, with a mechanism employing the effect of trimming, according to the invention.

The device used for creating forces in systems of manual control over aircraft comprises a housing 1, stationary relative to the aircraft, a leverage system, a reversible charging arrangement 2, a gear 3 actuating the device and a rod 4.

In accordance with the invention the leverage system comprises two levers 5 and 6 and a four-arm turning member 7, a rotation axis 8 of the four-arm turning member 7 being disposed on the housing 1.

An arm $a$ of the four-arm turning member 7 is hinged to a rod 9 connected to the booster (not shown in the drawing), an arm $b$ is hinged to a rod 10 connected to the control handle (not shown in the drawing), an arm $c$ is hinged to a movable rod 11 of the charging arrangement 2, and an arm $d$ carries a rotation axis 12 of the lever 6. An arm $g$ of the lever 6 is hinged to a rod 13 at one end of the gear 3 actuating the device, which gear 3 is hinged at its other end to housing 1 at 8, and an arm $h$ is hinged to one of the ends of the rod 4. A rotation axis 14 of the lever 5 is disposed on the housing 1, whereas an arm $e$ is hinged to the other end of the rod 4 and an arm $f$ hinged to the casing of the charging arrangement 2.

FIG. 2 shows an embodiment of the device used for creating forces in manual control systems employed in flying machines.

In this case the rod 4 is made adjustable in its length and is substituted, for instance with a mechanism 15 employing the effect of trimming.

The device operates as follows.

FIG. 1 shows the device in a position when the booster is disengaged and the operator is not to feel any nuisance loads acting upon the handle.

In case the arm $c$ is chosen to be equal and parallel to the arm $f$, and the arm $e$ to be equal and parallel to a straight line section connecting the point through which the axis 8 passes with the point at which the arm $h$ of the lever 6 is hinged to the rod 4 (section $k$), kinematically the device will be presented as two parallelograms having hinges disposed in the corners thereof, and wherein the side $c$ of the first parallelogram is equal and parallel to $f$, and the side $e$ of the other parallelogram is equal and parallel to $k$.

By deflecting the control handle the operator displaces the rod 10, which results in a turn of the four-arm member 7 round the axis 8 and, further, in a parallel displacement of the corners of said parallelograms, without causing any extension or compression of the charging arrangement 2. As a result, with the booster disengaged, the operator feels no nuisance loads acting upon the handle.

With the booster engaged, an electric signal is supplied into the device actuating gear 3 which start to expand, thus causing the lever 6 to turn round the axis 12.

As a result of this, the point at which the arm $h$ of the lever 6 is hinged to the rod 4, moves along an arc towards the point through which the axis 8 passes. With said points aligned, the parallelogram (with the sides $e$ and $k$ which are equal and parallel) becomes a triangle, wherein one side is formed by the arm $e$, and the apex opposite to said side is disposed at the point through which the axis 8 passes; which triangle, with the control handle being displaced, prevents the lever 5 from turning about the axis 14. As a result, the charging arrangement expands or compresses, and the operator, while deflecting the handle, feels a load which is linearly changing.

In case the point at which the arm $h$ of the lever 6 is hinged to the rod 4, while moving along an arc towards the point through which the axis 8 passes, comes to a stop in an intermediate position, for instance in the case of an intermediate position of the gear 3 actuating the device, the parallelogram with the sides $e$ and $k$ will turn into a trapezium. This will limit the turn of the lever 5 round the axis 14, and will result in a non-linear change of the load acting upon the control handle in the course of the displacement thereof.

It should be noted that, in case the levers form a triangle, the control handle undergoes maximum loads which decrease when this triangle is turned into a trapezium, and reach zero when the arm $e$ is equal to the section $k$ (i.e. when a parallelogram is formed).

FIG. 2 shows an embodiment of the device used for creating forces in systems of manual control over flying machines and employing an irreversible booster.

Unlike in the device shown in FIG. 1, the gear 3 actuating the device can be stopped in this case only in two extreme positions—"on" an "off."

In case the pilot does not send a signal for actuation of the mechanism 15 employing the effect of trimming, the device shown in FIG. 2 operates in a manner analogous to the afore-described one.

In the case of a protracted manoeuvre, for instance when flying with the engine of one of the wings out of operation, the pilot, by displacing the handle, turns the four-arm member 7 for a considerable angle, as a result of which he feels for a long time substantial load supplied from the charging arrangement 2.

In order to relieve the handle of this heavy load without changing the angle of turning of the four-arm member 7, which corresponds to a necessary deviation angle of the elevator, the pilot sends a signal actuating the mechanism employing the effect of trimming and the latter, by changing its length, causes the lever 5 to turn round the axis 14, thus changing the length of the charging arrangement 2 and relieving the control handle of the load.

The present invention has made it possible to provide a device used for creating forces in systems of manual control over aircraft which is simple in design and highly reliable in operation and in which, with the booster disengaged, no nuisance loads act upon the control handle, and the range of the actuating members' deviation angles is not narrowed.

Though the present invention has been described in connection with the preferred embodiment, it is evident that various alternations and modifications may take place without departing from the spirit and scope of the invention, which will be readily understood by those skilled in the art.

These variations and modifications are considered to be falling within the spirit and scope of the invention as defined in the appended claims.

What is claimed is:

1. A device used for creating forces in systems of manual control over aircraft, comprising an irreversible booster; a stationary housing; a four-arm turning member hinged to said housing; a first lever hinged to said housing; a second lever hinged to a first arm of said four-arm member; a rod of said booster, hinged to a second arm of said four-arm member; a control handle actuated member hinged to a third arm of said four-arm member; a reversible charging arrangement having its movable rod hinged to a fourth arm of said four-arm member and its casing hinged to one of the arms of said first lever; a device actuating gear, including a movable rod hinged to said stationary housing and a casing hinged to one of the arms of said second lever; a rod means hinged by its one end to the other arm of said first lever, and by its other end hinged to the other arm of said second lever.

2. A device as claimed in claim 1, wherein said rod means is adjustable in its length for the effect of trimming.

References Cited
UNITED STATES PATENTS

| | | | |
|---|---|---|---|
| 3,303,714 | 2/1967 | Fontaine | 74—470 |
| 3,303,715 | 2/1967 | Zimer | 74—470 |

MILTON KAUFMAN, Primary Examiner

U.S. Cl. X.R.

244—83